United States Patent [19]

Manderfeld et al.

[11] Patent Number: 5,620,735
[45] Date of Patent: Apr. 15, 1997

[54] SIMULATED EGG PATTY

[75] Inventors: Michelle M. Manderfeld; John D. Efstathiou, both of Plymouth; Arlene H. Voecks, Monticello, all of Minn.

[73] Assignee: Cargill, Incorporated, Minneapolis, Minn.

[21] Appl. No.: 381,779

[22] Filed: Feb. 1, 1995

[51] Int. Cl.$^6$ ........................................................ A23L 1/32
[52] U.S. Cl. ............................ 426/614; 426/512; 426/515
[58] Field of Search .................................... 426/614, 512, 426/515

[56] References Cited

U.S. PATENT DOCUMENTS

| | | | |
|---|---|---|---|
| 3,285,749 | 11/1966 | Shires | 99/113 |
| 3,493,393 | 2/1970 | Shires | 99/113 |
| 3,717,474 | 2/1973 | Fioriti et al. | 99/113 |
| 3,843,811 | 10/1974 | Seeley | 426/211 |
| 3,863,018 | 1/1975 | Shires | 426/388 |
| 3,941,892 | 3/1976 | Glasser et al. | 426/104 |
| 3,974,296 | 8/1976 | Burkwall, Jr. | 426/104 |
| 4,182,779 | 1/1980 | Chess | 426/558 |
| 4,409,249 | 10/1983 | Forkner | 426/100 |
| 4,426,400 | 1/1984 | Newlin et al. | 426/614 |
| 4,675,202 | 6/1987 | Wenger et al. | 426/614 |
| 4,822,628 | 4/1989 | Huc | 426/614 |
| 4,862,790 | 9/1989 | Platteschorre et al. | 99/353 |
| 5,073,399 | 12/1991 | Vassiliou | 426/614 |
| 5,149,561 | 9/1992 | Vassiliou | 426/614 |
| 5,151,293 | 9/1992 | Vassiliou | 426/614 |
| 5,192,566 | 3/1993 | Cox et al. | 428/89 |
| 5,227,189 | 7/1993 | Vassiliou | 426/614 |
| 5,266,338 | 11/1993 | Cascione et al. | 426/32 |

FOREIGN PATENT DOCUMENTS

| | | | |
|---|---|---|---|
| 744312 | 6/1970 | Belgium | 426/614 |
| 6-30734 | 2/1994 | Japan | 426/614 |

OTHER PUBLICATIONS

Moran, T., "The Freezing of Eggs", *International Congress of Refrigeration*, Jun. 17th Session, Section I, pp. 122–137.
Moran, T., "The Effect of Low Temperature on Hens' Eggs", pp. 436–456, Received Jun. 4, 1925.
Jaax et al., "The Effect of Pasteurization, Selected Additives and Freezing Rate on the Gelation of Frozen–Defrosted Egg Yolk", Department of Foods & Nutrition, Kansas Univ., Manhattan, KA 66502, pp. 1013–1022.
Pearce J. A. et al., "Liquid and Frozen Eggs", *Canadian Journal of Research*, vol. 27, Sec. F., 5/49, No. 5, Issued by the National Research Council of Canada.

*Primary Examiner*—Anthony J. Weier
*Attorney, Agent, or Firm*—Fitch, Even, Tabin & Flannery

[57] ABSTRACT

Simulated egg patties and simulated egg yolks, and methods of preparing them, are provided. The simulated egg patties and simulated egg yolks have superior mouthfeel and texture characteristics which are similar to a fried egg prepared from a fresh, natural egg. The simulated egg yolks are prepared by freezing a predetermined amount of egg yolk in a predetermined shape whereby the egg yolk structure is modified so that, upon thawing, the egg yolk is gel-like and essentially maintains its shape. The frozen egg yolk can be combined with, or essentially surrounded with, egg white and then cooked to form a simulated egg patty. Preferably the egg yolk is pre-cooled prior to freezing and the frozen egg yolk is tempered prior to cooking. Upon cooking, the egg yolk portion of the simulated egg patty or the simulated egg yolk has similar mouthfeel and texture to cooked fresh egg yolk.

32 Claims, No Drawings

SIMULATED EGG PATTY

FIELD OF THE INVENTION

This invention generally relates to the field of egg products. More specifically, this invention relates to simulated egg patties and simulated egg yolks having taste, texture, and mouthfeel properties similar to fresh egg products. This invention also relates to methods of producing simulated egg patties and/or simulated egg yolks having taste, texture, and mouthfeel properties similar to fresh egg products.

BACKGROUND OF THE INVENTION

Natural and undisrupted liquid egg yolk contains microscopic sacs which contain protein, fat, water, and other components. When such natural and undisrupted liquid egg yolk is cooked (e.g., fried), a crumbly gel-like structure and texture is obtained. Once the microscopic sacs contained in the liquid egg yolk are disrupted, however, the egg yolk becomes rubbery and tough when cooked.

Numerous attempts have been made to prepare a simulated egg produce having a distinct yolk portion and a distinct egg white portion (i.e., a simulated fried egg). None of these efforts of which are aware has been able to successfully compete with natural eggs in terms of consumer acceptance. Indeed, the most successful processed egg products on the market are the liquid or frozen egg substitutes such as, for example, EggBeaters™ and the like. These egg substitutes are suitable for scrambled eggs, omelettes, and recipes requiring whole eggs; such egg substitutes cannot, of course, simulate fried eggs or other egg products requiring separate yolk and egg white portions.

Shires, U.S. Pat. No. 3,863,018 (Jan. 28, 1975), provided a method to produce a simulated egg product using a solid, frozen core or stick of cooked egg yolk which was suspended in liquid egg whites in an elongated container. While maintaining the container in a vertical position and gently shaking the container to center the frozen yolk core, the egg whites were coagulated by either heating or freezing. The frozen yolk core was prepared by extruding cooked egg yolk in a stick-like form and then freezing until rigid. The egg product so produced could be cut into sections (i.e., patties) for use in sandwiches and the like.

Glasser et al., U.S. Pat. No. 3,941,892 (Mar. 2, 1976) provided a frozen egg product which simulated, at least in appearance, a sunnyside-up fried egg. A synthetic yolk material was used which contained dry egg white, oil, dry milk protein, gum, colors, flavoring, emulsifiers, and water. The yolk material along with the egg whites were frozen in an appropriate mold. The molded egg was then removed from the mold directly onto a cooking surface. As the yolk thawed during cooking, it tended to lose its shape "nearly to the point of running from its shape"; the shape was maintained only because the yolk coagulated before the shape was completely lost.

Forkner, U.S. Pat. No. 4,409,249 (Oct. 11, 1989), generally provided a process for preparing simulated eggs from homogeneous, aerated egg white dispersion and processed egg yolk. The assembled egg was frozen. In each case, the egg whites and yolk were treated separately and then combined; each could be separately pasteurized. A number of different processes, some of which involve frozen yolk bodies, were described. For all of these processes, the egg white was treated to effect a controlled degree of coagulation, after which the coagulated material (along with some uncoagulated material) was homogenized by high energy agitation with high shear forces. The homogenized egg white was then placed in an appropriate mold and topped with a predetermined weight of frozen yolk body. The assembled product could then be frozen and stored for extended periods. The egg yolk could be prepared from fresh eggs or from thawed commercial frozen egg yolk. The frozen egg yolk bodies could be used with or without an edible membrane formed by coating the frozen egg yolk body with a membrane-forming material (i.e., alginates, albumen, or waxes). The membrane was used to retain the yolk in the desired shape during subsequent thawing and cooking. Without this coating, the frozen yolk was subject to migration into, and mixing with, the egg white upon thawing and cooking; such uncoated egg yolk bodies were, therefore, more suited for preparing scrambled eggs and omelettes. In addition, Forkner acknowledged that the prior art provided for separating egg whites and egg yolk, depositing appropriate amounts of each into trays, and then freezing. But Forkner also reported that such a products, when thawed and cooked, tended to be "tough and lacking in palatability and flavor comparable to cooked fresh egg."

More recently, Vassiliou in U.S. Pat. Nos. 5,073,399 (Dec. 17, 1991), 5,149,561 (Sep. 22, 1992), 5,151,293 (Sep. 29, 1992), and 5,227,189 (Jul. 13, 1993) provided a simulated egg having separate yolk and egg white portions. The egg yolk was, however, a synthetic material containing an edible liquid, a colorant, and a negative thermoreversible gel former. The egg yolk and egg white portions were kept separate by a crust or shell which was formed around the yolk upon heating the yolk material containing the gel former.

None of the prior art relating to simulated egg patties or simulated egg products in general, of which are aware, provides suitable and acceptable egg patties from natural yolks and egg whites. It would be desirable, therefore, to provide a simulated egg patty made from natural egg yolk and egg whites having separate yolk and egg white portions. It would also be desirable to provide a simulated egg yolk and a simulated egg patty which have mouthfeel and texture similar to a fried egg prepared from a fresh egg. It would also be desirable to provide a simulated egg patty from pasteurized egg yolks and pasteurized egg whites. It would also be desirable to provide a relatively simple method by which such simulated egg yolks and simulated egg patties can be prepared. The present invention provides such simulated egg yolks and simulated egg patties as well as such a method.

SUMMARY OF THE INVENTION

The present invention relates to simulated egg patties and simulated egg yolks which have superior mouthfeel and texture characteristics and which are prepared from natural egg yolks and egg whites. The egg yolk of the present simulated egg patty is frozen in a predetermined shape under such freezing conditions whereby the egg yolk structure is modified so that, upon thawing, the egg yolk is gel-like and essentially maintains its shape. Generally the shaped egg yolk is frozen at a temperature of less than about 20° F., and preferably less than about 0° F., for a time sufficient to provide a gel-like, relatively firm and gel-like or self-supporting yolk structure upon thawing. The frozen egg yolk can be combined with, or essentially surrounded with, egg white and then cooked to form a simulated egg patty. Preferably the egg yolk is pre-cooled prior to freezing and the frozen egg yolk is tempered prior to cooking. Pre-cooling (or simply cooling) the egg yolk prior to freezing is preferably carried out at a temperature of about 0° to 25° F., and more preferably at about 15° to 20° F., for at least about 5 minutes, and preferably for about 5 to 25 minutes. Tempering, which can be implemented before or after combining the frozen egg yolk with the egg whites, is preferably carried out at a temperature of about 0° to 25° F., and more preferably at about 15° to 25° F., for at least about 5 minutes, and preferably for about 5 to 25 minutes. The simulated egg patty or simulated egg yolk can be cooked using conventional techniques. Upon cooking, the egg yolk portion of the simulated egg patty or the simulated egg yolk of the present invention has similar mouthfeel and texture to cooked fresh egg yolk.

One object of the present invention is to provide a method for producing a simulated egg patty, said method comprising:

(1) forming a predetermined amount of egg yolk into a predetermined shape;

(2) freezing the shaped egg yolk at a temperature less than about 20° F. for a time sufficient to provide a frozen shaped egg yolk which is gel-like and retains its shape upon thawing;

(3) combining the frozen shaped egg yolk with a predetermined amount of egg white; and (4) cooking the combined egg yolk and egg white to obtain a simulated egg patty;

wherein the cooked egg yolk has similar mouthfeel and texture to cooked fresh egg yolk.

Another object of the present invention is to provide a method for producing a simulated egg patty, said method comprising:

(1) forming a predetermined amount of egg yolk into a predetermined shape;

(2) cooling the shaped egg yolk to a temperature of about 0° to 25° F. for at least about 5 minutes;

(3) freezing the cooled shaped egg yolk at a temperature less than about 20° F. for a time sufficient to provide a frozen shaped egg yolk which is gel-like and retains its shape upon thawing;;

(4) combining the frozen shaped egg yolk with a predetermined amount of egg white;

(5) tempering the frozen shaped egg yolk at a temperature of about 0° to 25° F. for at least about 5 minutes; and (6) cooking the combined tempered egg yolk and egg white from step (5) to obtain a simulated egg patty;

wherein the cooked egg yolk has similar mouthfeel and texture to cooked fresh egg yolk.

Still another object of the present invention is to provide a simulated egg patty comprising a shaped egg yolk portion and an egg white portion at least partially surrounding the shaped egg yolk portion, wherein the shaped egg yolk portion is frozen, prior to being combined with the egg white portion, at a temperature and for a time sufficient to provide a gel-like yolk structure which essentially retains its shape upon thawing, wherein the shaped egg yolk portion and the egg white portion, after combining, are cooked to form the simulated egg patty, and wherein the shaped egg yolk portion, after cooking, has similar mouthfeel and texture to cooked egg yolk prepared from fresh egg yolk.

Still another object of the present invention is to provide a simulated egg yolk comprising an egg yolk patty prepared by forming a egg yolk composition into a patty shape, freezing the patty-shaped egg yolk, and cooking the frozen patty-shaped egg yolk, wherein the patty-shaped egg yolk, upon thawing and prior to cooking, has a gel-like structure and essentially maintains its patty shape and wherein the simulated egg yolk, upon cooking, has a similar mouthfeel and texture to cooked egg yolk prepared from fresh egg yolk.

These and other objects and advantages of the of the present invention will become apparent from the following detailed description.

DETAILED DESCRIPTION OF THE INVENTION

The present invention provides a simulated egg patty having a separate yolk portion and a separate egg white portion which has superior mouthfeel and textural characteristics when cooked. The present invention also provides a simulated egg yolk which has superior mouthfeel and textural characteristics when cooked. Indeed, the yolk of the present invention, when cooked, has mouthfeel and texture similar to a cooked yolk prepared from a fresh egg. In other words, the texture of the cooked egg yolk of the present invention is firm and crumbly rather than tough and rubbery. In the present invention, the egg yolk is frozen before being combined with the egg white. In a preferred embodiment of the present invention, the egg yolk is subjected to a precooling step prior to being frozen. In another preferred embodiment of the present invention, the frozen egg yolk is subjected to a tempering step prior to being cooked. The freezing treatment, especially when combined with the precooling and tempering steps, modifies the structure of the egg yolk such that resulting egg yolk has a gel-like structure which tends to maintain its shape during thawing and cooking. In other words, the resulting egg yolk, when thawed separately or surrounded by egg white, and/or during subsequent cooking, has a significantly reduced tendency to flow. After cooking, the simulated yolk of this invention has a gel-like structure and crumbly texture similar to cooked fresh egg yolk.

The egg yolk and egg whites used in the present invention can be obtained directly from natural eggs or, if desired, from modified egg yolks or modified egg whites. For example, egg yolks can be pasteurized and/or pre-treated to reduce the cholesterol level. Preferably both the egg yolks and the egg whites used in the present invention are pasteurized. In some instances, preferably the egg yolks also have reduced levels of cholesterol or are essentially cholesterol-free. Various additives, if desired, can be incorporated into the yolk and/or egg whites prior to forming the simulated egg patties of the present invention. Such additives include, for example, pH modifiers, flavorings, stabilizers, food preservatives, colorants, and the like. For example, citric acid, lactic acid, sodium lactate, or the like can be added to the egg yolk to adjust the pH to about 5.3 to 6.2 in order to prevent discoloration (i.e., "greening") which can sometimes occur during subsequent cooking if the pH is too high (i.e., about 6.2 or higher). Nisin (generally at about 2 to 200 ppm) or potassium sorbate (generally up to about 0.3 weight percent) can also be added to the yolk in order to provide additional anti-microbacterial activity and increased shelf-life.

The present invention generally involves freezing individual egg yolk patties at a temperature and for a time sufficient to provide a frozen egg yolk which is gel-like and essentially retains its shape upon thawing and which, upon cooking, has similar mouthfeel and texture to cooked fresh egg yolk. The process of this invention can be carried in a batch, semi-continuous, or continuous operation. The process of this invention is ideally suited for, and preferably is carried out in, a semi-continuous or continuous mode using on-line filling, freezing, and cooking equipment.

The method of this invention involves first forming a predetermined amount of egg yolk into a predetermined shape. Preferably, the predetermined amount of egg yolk for an individual patty corresponds roughly to the size of the natural yolk contained in a fresh egg (e.g., about 12 to 20 g); of course, individual yolk patties containing smaller or larger amounts can be prepared if desired. Preferably, the predetermined shape for the yolk patties is selected to mimic the yolk of a fried egg prepared from a fresh, shelled egg. For example, the individual yolk patties could be formed into the general shape of a "sombrero" to mimic a sunny-side-up fried egg. Or the individual yolk patties could be formed into crescent shapes, circular shapes, elliptical shapes, "children's" shapes (e.g., stars, teddy bears), or the like. If desired, various designs or symbols could be incorporated into the egg yolk using an appropriate mold. The yolk patties can be formed directly in pans or trays having a plurality of separate, individual mold impressions or depressions. The yolk patties can also be formed directly in suitable plastic (e.g., polyvinyl chloride and the like) inserts or molds which are held in a suitable tray. Preferably, the yolk patty will be generally disk-like in shape with a diameter of about 1 to 2.5 inches and a thickness of about 0.25 to 1 inch; the diameters and thickness can, of course, be smaller or larger if desired.

Once formed, the yolk patties are frozen at a suitable temperature and for a suitable duration to achieve the desired gel-like nature and texture described herein. Preferably, the shaped yolk patties are frozen at a temperature of less than about 0° F. for at least about 15 minutes. More preferably, the shaped yolk patties are frozen at a temperature of less than about −10° F. for at least about 15 minutes. Even more preferably, the shaped yolk patties are frozen at a temperature of less than about −20° F. for at least about 15 minutes. Egg yolks frozen at temperatures as high as about 20° F. can be satisfactory so long as the freezing duration is sufficiently long to achieve the desired gel-like nature and texture described herein.

Once the yolk patties have been appropriately frozen, they can be cooked (alone or with combined egg whites) and used immediately or stored at freezing or refrigeration conditions until used. To prepare the simulated egg patties of this invention, the shaped frozen yolks are combined with a predetermined amount of egg white in a suitable container or support system for containing and shaping the simulated egg patty. Preferably, the predetermined amount of egg white for an individual patty corresponds roughly to the size of the natural egg white contained in a fresh egg (e.g., about 20 to 40 g). To mimic a natural egg, the weight ratio of yolk to egg white in the combined egg patty will normally be about ½. Of course, individual egg patties containing smaller or larger amounts of egg white or different ratios of yolk to egg white can be prepared if desired. Preferably, the amount of egg white added will be sufficient to provide an egg patty generally disk-like in shape with a diameter of about 2 to 4 inches and a thickness of about 0.25 to 1 inch; the diameters and thickness can, of course, be smaller or larger if desired. An especially preferred egg patty is of the size and dimensions to be used in a sandwich, especially a fast-food breakfast type sandwich.

Generally, each simulated egg patty will contain only one frozen egg yolk. Of course, if desired, more than one frozen egg yolk can be used in a simulated egg patty (e.g., a double-yolk simulated egg patty). The frozen yolk and egg whites can be combined in any order. Preferably, the egg whites at least partially surround the frozen egg yolk to more closely mimic a natural fried egg. The frozen yolk can be placed in an egg patty container (e.g., restraining or support ring for containing the egg whites and suitable for use during cooking) and then egg whites added. Or, the egg whites can be added first, followed by the frozen yolk which can partially float on and/or partially sink into the egg whites. The egg white may partially or fully encapsulate the egg yolk as desired. Preferably, a portion of the egg yolk is visible in the finished (i.e., cooked) simulated egg patty so that it more closely mimics a natural fried egg.

Once the frozen egg yolk and egg whites have been appropriately combined, the combined egg yolk and egg whites are cooked using conventional techniques to obtain the simulated egg patty. Suitable cooking techniques include, for example, steam cooking, microwave cooking, grill cooking, and the like. Generally, steam cooking is preferred (especially when incorporated into a production line system). Typically, simulated egg patties of about 0.5 inch thickness and about 3 inch diameter can be steam cooked at about 200° to 210° F. for about 4 to 6 minutes. Once cooked, the simulated egg patties may be served immediately or, if desired, frozen or refrigerated and stored for use at a later time. Refrigeration should be at temperatures below about 40° F. Such refrigerated or frozen simulated egg patties can be reheated and served at a later time.

As noted above, the yolk patties are frozen at a temperature and for a time sufficient for the yolk to form a gel-like structure which, upon thawing, maintains the shape of the patty and which, upon cooking, forms a crumbly, gel-like structure resembling a natural fried egg yolk. It is generally preferred that the yolk patties are frozen at a temperature and for a time so that such a gel-like structure is formed throughout the yolk body. Such a yolk, when cut or sliced, would tend to maintain its shape even along the cut surfaces when thawed. Although not wishing to be limited by theory, it appears that ice crystal formation during the freezing step is important in obtaining the desired gel structure. It is preferred, therefore, that the freezing conditions be such that ice crystal formation occurs in the yolk, and more preferably throughout the yolk. Ice crystal formation appears to effect the protein structure in the yolk such that the yolk, upon thawing, tends to maintain its shape, and, upon cooking, has a crumbly texture and mouthfeel similar to a fried egg prepared from a fresh egg. It also appears that freezing conditions in which crystal formation is significantly reduced (e.g., very rapid freezing) can often result in frozen yolks which do not possess the desired gel-like structure. Freezing the yolk patties in commercially available in-line food freezing equipment using the method of this invention will generally result in frozen yolks having the desired gel-like structure.

Such crystal formation and protein modification, which appears to be desirable, can be encouraged by a pre-cooling or cooling stage before the hard freezing stage. Such pre-cooling can significantly reduce, or perhaps even effectively eliminate, the possibility of too rapid freezing. With such a pre-cooling step, the temperature of the frozen yolk can be reduced more rapidly in the hard freezing stage than would otherwise be possible since crystal formation will be initiated in the pre-cooling stage. Thus, it is generally preferred that the shaped egg yolk is cooled to a temperature of about 0° to 25° F. for at least about 5 minutes, and preferably for about 5 to 25 minutes, before the hard freezing step. More preferably, the shaped egg yolk is cooled to a temperature of about 15° to 20° F. for about 10 to 20 minutes before the hard freezing step. Generally, the temperature of the pre-cooling stage will be below about 25° to 30° F. (i.e., just below the freezing point of water) and at least about 20° F. above the hard freezing temperature. Such an initial cooling or pre-cooling stage can easily be incorporated into on-line commercial freezing equipment or process lines. A pre-cooling stage of about 20° F. for about 10 to 20 minutes has been found to be suitable for use with a hard freeze stage of about −10° to about −30° F.

Preferably, the hard frozen egg yolk is tempered before the cooking step. Again not wishing to be limited by theory, it appears that such a tempering step does not appreciably affect the gel-like structure of the simulated egg yolk. Rather, it appears that such a tempering step allows the egg yolk and the egg white to cook more evenly by bringing them closer to the same temperature at the start of the cooking stage. If, at the beginning of the cooking stage, the egg yolk and egg whites are at significantly different temperatures (e.g., the yolk at about −20° F. and the whites at about 40° F.), it is possible that the whites would be overcooked by the time the yolk is properly cooked. It is generally preferred, therefore, that the frozen egg yolk is tempered at a temperature of about 0° to 25° F. for at least about 5 minutes, and preferably for about 5 to 25 minutes, before the cooking step. More preferably, the shaped egg yolk is tempered to a temperature of about 15° to 25° F. for about 10 to 20 minutes before the cooking step. Such tempering preferably should bring the temperatures of the frozen yolk and the egg whites within at least about 15° to 20° F. of each other. Such tempering can occur before or after the frozen yolk is combined with the egg whites. Generally it is preferred that the tempering step occur before combining the frozen yolks and egg whites. Such an tempering stage can easily be incorporated into on-line commercial freezing equipment or process lines. A tempering stage of about 20° F. for about 10 to 20 minutes has been found to be suitable for frozen yolks at about −10° to about −30° F.

The following examples are intended to further illustrate the invention and not to limit it.

Example 1. A yolk mold was filled with blended raw egg yolk (about 16.5 g) and frozen at −10° F. for three days. The frozen yolk was added to liquid egg white (about 33 g) in an egg patty form and then cooked with steam at 210° F. for 4.5 minutes to provide a simulated egg patty. For comparison purposes, blended raw egg yolk was refrigerated for three days. The refrigerated raw egg yolk (about 16.5 g) was injected into liquid egg white (about 33 g) in an egg patty form and cooked under the same conditions.

Egg patties prepared from the frozen yolk closely resembled patties prepared from fresh shell eggs. The frozen yolk remained intact within the liquid egg white (i.e., did not flow) as it thawed and cooked. The yolk of the cooked egg patty prepared from the frozen yolk was gel-like and crumbly much like that of a fried egg prepared from a fresh shell egg. In contrast, the refrigerated yolk tended to spread out and flow within, and on top of, the egg white and, upon cooking, was rubbery with small air bubbles. The cooked egg patty prepared from the frozen yolk was superior in both mouthfeel and texture as compared to the cooked egg patty prepared from the refrigerated yolk.

Example 2. Yolk forms were separately filled with pasteurized egg yolk and raw egg yolk. Samples were frozen at −10° F. for three days. Samples prepared from the pasteurized and raw egg yolk were thawed at room temperature. No differences between the thawed yolks were apparent. Both samples appeared to be equally gelled and held their shapes upon thawing.

Frozen yolks from both pasteurized and raw egg yolks were also added to egg whites in an egg patty form and cooked as in Example 1. No differences were noted in the cooked simulated egg prepared from pasteurized and raw egg yolks. Both samples were equally gelled and had a crumbly yolk texture.

Example 3. Blended egg yolks (pH adjusted to about 5.75 with citrus acid) were frozen under various freezing conditions using on-line production equipment. Yolk samples were frozen in stainless steel trays with rounded sample wells. The on-line production equipment used a pre-cooling stage, a hard freezing stage, and a tempering stage. After freezing and tempering, yolk samples were thawed to evaluate consistency and resistance to flow. Yolk samples were also evaluated by placing the sample in a cooking ring containing egg whites and cooking the resulting egg patty. The results are presented in the following Table. Results were compared against similar yolk samples frozen at 0° F. for 5 days; such "control" samples gave stiff, gel-like yolks which held their shapes upon thawing. The temperatures reported in the Table are the air temperatures to which the samples were exposed. In a few instances, the actual temperature of the egg patties were measured. In Test Numbers 4 and 7, the egg patties exiting the tempering stages had actual temperatures of 13° F. and 18° F., respectively.

These results confirm that simulated egg patties can be prepared on-line using the process of this invention with a pre-cooling stage, a hard freeze stage, and a tempering stage. Generally, the best and most consistent results were obtained when the hard freeze section employed a temperatures at or below about −20° F. for about 15 minutes or more. Although satisfactory results could be obtained at higher freezing temperatures, the results were not as consistent. For example, at a hard freeze of 0° F., Test Numbers 1 and 5 generally provided satisfactory results whereas Test Numbers 2 and 3 did not. Thus, it appears that satisfactory results can also be obtained at higher freezing temperatures if the duration of the pre-cooling, hard freeze, and/or tempering stages is increased. One skilled in the art could, using the guidelines of this example and specification, prepare satisfactory simulated egg patties and simulated egg yolks in on-line production equipment with hard freezing temperatures of 0° F. and lower. Similarly satisfactory results are expected at freezing temperatures as high as 20° F. so long as the duration of the hard freeze is increased sufficiently.

TABLE

Data for Example 3.

| Test Number | Pre-Cool | Freeze | Temper | Thawed Evaluation | Cooked Evaluation |
| --- | --- | --- | --- | --- | --- |
| 1 | 20° F. 10 min | 0° F. 20 min | 20° F. 10 min | Held shape somewhat but not as well as control | Bubbles around edges & bottom |

TABLE-continued

Data for Example 3.

| Test Number | Pre-Cool | Freeze | Temper | Thawed Evaluation | Cooked Evaluation |
|---|---|---|---|---|---|
| 2 | 20° F. 5 min | 0° F. 10 min | 20° F. 5 min | Did not gel; ran all over | Not gel-like |
| 3 | 20° F. 7.5 min | 0° F. 15 min | 20° F. 7.5 min | Did not hold shape well; thicker but not gel-like | Gel-like at center; tiny bubbles around edges & bottom |
| 4 | 20° F. 7.5 min | −40° F. 15 min | 20° F. 7.5 min | Held shape well; gel-like | Gel-like at center; tiny bubbles around edges & bottom |
| 5 | 20° F. 17.5 min | 0° F. 35 min | 20° F. 17.5 min | Held shape better than Test No. 3; gel-like | Good texture; fewer bubbles than Test No. 3 |
| 6 | 20° F. 17.5 min | −40° F. 35 min | 20° F. 17.5 min | Slightly thicker/more gelled than Test No. 4; close to control | Gel-like; few bubbles |
| 7 | 20° F. 7.5 min | −40° F. 15 min | 20° F. 11 min | Held shape well; gel-like | Gel-like at center; tiny bubbles around edges & bottom |
| 8 | 20° F. 7.5 min | −30° F. 15 min | 20° F. 14 min | Held shape; gel-like | Center gel-like; small bubbles at bottom & edges |
| 9 | 20° F. 7.5 min | −20° F. 15 min | 20° F. 14 min | Held shape; gel-like | Center gel-like; small bubbles at bottom & edges |
| 10 | 20° F. 7.5 min | −10° F. 15 min | 20° F. 11 min | Did not hold shape well; not as gel-like as Test Nos. 7, 8, & 9 | Bubbles at bottom & edges |
| 11 | none | −40° F. 18 min | 20° F. 14 min | Held shape well; gel like | Bubbles at bottom & edges |

That which is claimed is:

1. A simulated egg patty comprising a shaped egg yolk portion and an egg white portion at least partially surrounding the shaped egg yolk portion, wherein the shaped egg yolk portion is frozen, prior to being combined with the egg white portion, at a temperature and for a time sufficient to provide a gel-like yolk structure which is self supporting and essentially retains its shape upon thawing, wherein the shaped egg yolk portion and the egg white portion, after combining, are cooked to form the simulated egg patty, and wherein the shaped egg yolk portion, after cooking, has similar mouthfeel and texture to cooked egg yolk prepared from fresh egg yolk.

2. A simulated egg patty as defined in claim 1, wherein the shaped egg yolk portion is frozen at a temperature less than about 0° F. for at least about 15 minutes.

3. A simulated egg patty as defined in claim 2, wherein the shaped egg yolk portion, prior to freezing, is cooled to a temperature of about 0° to about 25° F. for at least about 5 minutes.

4. A simulated egg patty as defined in claim 1 or 3, wherein the shaped egg yolk portion is frozen at a temperature of less than about −10° F. for at least about 15 minutes.

5. A simulated egg patty as defined in claim 3, wherein prior to cooking the frozen egg portion is tempered at a temperature of about 0° to about 25° F. for at least about 5 minutes before cooking.

6. A simulated egg patty as defined in claim 4, wherein the frozen egg yolk portion is tempered at a temperature of about 15° to about 25° F. for about 10 to about 20 minutes before cooking and before the egg yolk portion and the egg white portion are combined.

7. A simulated egg patty as defined in claim 1, wherein the egg yolk portion is pasteurized prior to being frozen and the egg white portion is pasteurized prior to being combined with the egg yolk portion.

8. A simulated egg patty as defined in claim 3, wherein the egg yolk portion is pasteurized prior to being frozen and the egg white portion is pasteurized prior to being combined with the egg yolk portion.

9. A simulated egg patty as defined in claim 4, wherein the egg yolk portion is pasteurized prior to being frozen and the egg white portion is pasteurized prior to being combined with the egg yolk portion.

10. A simulated egg patty as defined in claim 7, wherein the egg yolk portion is treated to reduce its cholesterol level prior to being frozen.

11. A simulated egg patty as defined in claim 8, wherein the egg yolk portion is treated to reduce its cholesterol level prior to being frozen.

12. A simulated egg patty as defined in claim 9, wherein the egg yolk portion is treated to reduce its cholesterol level prior to being frozen.

13. A simulated egg patty as defined in claims 1 or 2, wherein the shaped egg yolk portion is frozen at a temperature less than about −20° F. for at least about 15 minutes.

14. A simulated egg patty as defined in claim 13, wherein the shaped egg yolk portion, prior to freezing, is cooled to a temperature of about 0° F. to about 25° F. for at least about 5 minutes.

15. A simulated egg patty as defined in claim 14, wherein the frozen egg yolk portion is tempered at a temperature of about 15° F. to about 25° F. for about 10 to about 20 minutes before cooking and before the egg yolk portion and the egg white portion are combined.

16. A simulated egg patty as defined in claim 5, wherein the egg yolk portion is pasteurized prior to being frozen and the egg white portion is pasteurized prior to being combined with the egg yolk portion.

17. A simulated egg patty as defined in claim 13, wherein the egg yolk portion is pasteurized prior to being frozen and the egg white portion is pasteurized prior to being combined with the egg yolk portion.

18. A simulated egg patty as defined in claim 14, wherein the egg yolk portion is pasteurized prior to being frozen and the egg white portion is pasteurized prior to being combined with the egg yolk portion.

19. A simulated egg patty as defined in claim 13, wherein the egg yolk portion is pasteurized prior to being frozen and the egg white portion is pasteurized prior to being combined with the egg yolk portion.

20. A simulated egg patty as defined in claim 14, wherein the egg yolk portion is pasteurized prior to being frozen and the egg white portion is pasteurized prior to being combined with the egg yolk portion.

21. A simulated egg patty as defined in claim 1, wherein the shaped egg patty is cooked at a temperature of from about 200° F. to about 210° F. about 4 to about 6 minutes.

22. A simulated egg patty comprising a shaped egg yolk portion and an egg white portion, the egg white portion being made from pasteurized egg white, the egg white portion at least partially surrounding the shaped egg yolk portion, wherein pasteurized egg yolk is formed into a shaped egg yolk portion, the shaped egg yolk portion is frozen at a temperature of less than about 20° F. for a time sufficient to provide a gel-like yolk structure which is self supporting and essentially retains its shape along cut surfaces upon thawing prior to being combined with the egg white portion in a container which restrains the egg white portion, wherein the shaped egg yolk portion and the egg white portion, after combining, are cooked to form the simulated egg patty, and wherein the shaped egg yolk portion, after cooking, has similar mouthfeel and texture to cooked egg yolk prepared from fresh egg yolk, and after cooking, the simulated egg patty mimics a fried egg.

23. A simulated egg patty as defined in claim 22, wherein the egg frozen egg yolk portion is tempered for at least about 5 minutes at a temperature of from about 0° F. to about 25° F. prior to cooking.

24. A simulated egg patty as defined in claims 22 or 23, wherein the shaped egg yolk portion, prior to freezing, is cooled to a temperature of about 0° F. to about 25° F. for at least about 5 minutes.

25. A simulated egg patty as defined in claims 22 or 23, wherein the shaped egg patty is cooked at a temperature of from about 200° F. to about 210° F. about 4 to about 6 minutes.

26. A simulated egg patty as defined in claim 22, wherein the shaped egg yolk portion is frozen at a temperature less than about −20° F. for at least about 15 minutes.

27. An uncooked simulated egg patty comprising a shaped egg yolk portion and an egg white portion, the egg white portion being made from pasteurized egg white, the egg white portion at least partially surrounding the shaped egg yolk portion, wherein pasteurized egg yolk is formed into a shaped egg yolk portion, the shaped egg yolk portion is frozen at a temperature and for a time sufficient to provide a gel-like yolk structure which is self supporting and essentially retains its shape along cut surfaces upon thawing prior to being combined with the egg white portion in a container which restrains the egg white portion, wherein after cooking the uncooked simulated egg patty is effective for providing product which includes an egg yolk which has similar mouthfeel and texture to cooked egg yolk, and after cooking, the simulated egg patty mimics a fried egg.

28. An uncooked simulated egg patty as defined in claim 27, wherein the shaped egg yolk portion, prior to freezing, is cooled to a temperature of about 0° F. to about 25° F. for at least about 5 minutes.

29. An uncooked simulated egg patty as defined in claim 27, wherein the shaped egg yolk portion is frozen at a temperature of less than about 20° F.

30. An uncooked shaped egg yolk product comprising egg yolk which has been formed from pasteurized egg yolk into a predetermined shape to provide a shaped egg yolk, the shaped egg yolk being frozen at a temperature and for a time sufficient to provide a gel-like yolk structure which is self supporting and essentially retains its shape along cut surfaces upon thawing to provide an uncooked gelled egg yolk product, the uncooked gelled egg yolk product upon combination with egg white and cooking the combined yolk product and egg white effective for providing cooked product which includes an egg yolk which has similar mouthfeel and texture to cooked egg yolk, and after cooking, the combination of yolk product and egg white mimics a fried egg.

31. An uncooked shaped egg yolk as defined in claim 30, wherein the shaped egg yolk, prior to freezing, is cooled to a temperature of about 0° F. to about 25° F. for at least about 5 minutes.

32. An uncooked shaped egg yolk as defined in claim 30, wherein the shaped egg yolk is frozen at a temperature of less than about 20° F.

* * * * *